US012398766B2

(12) United States Patent
Yulish et al.

(10) Patent No.: US 12,398,766 B2
(45) Date of Patent: Aug. 26, 2025

(54) METHOD FOR IMMOBILIZATION, CLUTCH, VEHICLE TRANSMISSION, DRIVE UNIT, AND VEHICLE

(71) Applicant: Robert Bosch GmbH, Stuttgart (DE)

(72) Inventors: Vladislav Yulish, Reutlingen (DE); Sigmund Braun, Kusterdingen (DE); Conrad Haeussermann, Trochtelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/003,569

(22) PCT Filed: Jun. 23, 2021

(86) PCT No.: PCT/EP2021/067058
§ 371 (c)(1),
(2) Date: Dec. 28, 2022

(87) PCT Pub. No.: WO2022/008236
PCT Pub. Date: Jan. 13, 2022

(65) Prior Publication Data
US 2023/0234535 A1    Jul. 27, 2023

(30) Foreign Application Priority Data
Jul. 8, 2020  (DE) .................... 10 2020 208 562.5

(51) Int. Cl.
*F16D 41/32* (2006.01)
*B62H 5/10* (2006.01)
(Continued)

(52) U.S. Cl.
CPC ............ *F16D 41/32* (2013.01); *F16D 27/118* (2013.01); *F16D 28/00* (2013.01); *B62H 5/10* (2013.01);
(Continued)

(58) Field of Classification Search
CPC ............ F16D 41/18–185; F16D 41/32; F16D 27/118; F16D 11/04; F16D 11/14;
(Continued)

(56) References Cited

U.S. PATENT DOCUMENTS 509,175 A     11/1893  Leonard
4,635,773 A *  1/1987  Llewellin ................. B64G 4/00
                                                           192/46
(Continued)

FOREIGN PATENT DOCUMENTS

CN     107161245 A      9/2017
CN     110131327 A *    8/2019  ............. F16D 28/00
(Continued)

OTHER PUBLICATIONS

International Search Report for PCT/EP2021/067058, Issued Oct. 5, 2021.
(Continued)

*Primary Examiner* — James J Taylor, II
(74) *Attorney, Agent, or Firm* — NORTON ROSE FULBRIGHT US LLP

(57) ABSTRACT

A method for immobilizing a vehicle, in particular an electric bicycle. A drive train of the vehicle includes a clutch that includes a first clutch component and a second clutch component that are situated coaxially with respect to one another and configured to be rotatably fixedly connected to one another by mechanical contact in at least one predefined rotational direction. The method includes: detecting an input of a user for activating an immobilizer, and actuating an actuator as a function of the detected input, as the result of which the first clutch component and/or the second clutch component are/is displaced in the axial direction, as the
(Continued)

result of which the mechanical contact between the first clutch component and the second clutch component is separated.

10 Claims, 5 Drawing Sheets

(51) Int. Cl.
    *F16D 11/04*     (2006.01)
    *F16D 27/118*     (2006.01)
    *F16D 28/00*     (2006.01)
    *F16D 41/18*     (2006.01)
    *F16D 41/26*     (2006.01)

(52) U.S. Cl.
    CPC ............ *F16D 11/04* (2013.01); *F16D 41/185* (2013.01); *F16D 41/26* (2013.01)

(58) Field of Classification Search
    CPC ...... F16D 28/00; B62H 5/08–12; B62M 5/00; B62M 11/02; B62M 1/36–38
    See application file for complete search history.

(56) References Cited

U.S. PATENT DOCUMENTS

| | | | |
|---|---|---|---|
| 5,083,991 A * | 1/1992 | Yang | B62M 11/145 |
| | | | 475/293 |
| 8,151,718 B2 * | 4/2012 | Mariman | F16D 41/22 |
| | | | 111/178 |
| 9,873,287 B2 * | 1/2018 | Emura | B62M 9/10 |
| 10,093,379 B2 * | 10/2018 | Hines | H04M 1/724098 |
| 11,541,964 B2 * | 1/2023 | Donner | F16H 3/66 |
| 2019/0032729 A1 | 1/2019 | Gao et al. | |
| 2021/0031849 A1 * | 2/2021 | Norup | B62H 5/148 |
| 2022/0111928 A1 * | 4/2022 | Donner | B62M 11/145 |

FOREIGN PATENT DOCUMENTS

| | | |
|---|---|---|
| DE | 104527 C | 11/1898 |
| DE | 10143204 A1 | 10/2002 |
| DE | 102014109000 A1 | 12/2015 |
| DE | 102018211476 A1 * | 1/2020 |
| EP | 3431685 A1 | 1/2019 |
| WO | 2016173804 A1 | 11/2016 |
| WO | 2019179587 A1 | 9/2019 |
| WO | WO-2019180857 A1 * | 9/2019 |
| WO | 2019203644 A2 | 10/2019 |

OTHER PUBLICATIONS

Fischer et al., "Xdrive Der Neue Allradantrieb Im BMW X3 Und BMW X5 [Xdrive the New Four-Wheel Drive Concept in the BMW X3 and BMW X5]," ATZ Worldwide, vol. 106, No. 2-5, 2004, pp. 92-102.

* cited by examiner

METHOD FOR IMMOBILIZATION, CLUTCH, VEHICLE TRANSMISSION, DRIVE UNIT, AND VEHICLE

The present invention relates to a method for immobilizing a vehicle. Moreover, the present invention relates to a clutch, in particular a freewheel clutch, that is configured to carry out the method for immobilization. Furthermore, the present invention relates to a vehicle transmission that includes the clutch or the freewheel clutch, and a drive unit that includes the clutch or the freewheel clutch. Moreover, the present invention relates to a vehicle that includes the clutch according to the present invention or the freewheel clutch according to the present invention, and/or a vehicle that includes the vehicle transmission according to the present invention and/or a vehicle that includes the drive unit according to the present invention. In particular, the present invention relates to an electric bicycle as the vehicle.

BACKGROUND INFORMATION

Vehicle theft is generally prevented by using locks. However, such vehicle locks, in particular chain locks or U-locks for bicycles, are not easily actuated in an automated manner, are frequently dirty and cumbersome, and are difficult to transport. In addition, the vehicle may continue to be operated normally after a vehicle lock is disassembled or is destroyed, for which reason an alternative and/or additional concept for theft prevention is desirable.

PCT International Patent Application No. WO 2019/203644 A2 describes a bicycle lock.
European Patent Application No. EP 3 431 685 A1 provides a bicycle locking device and a locking method.
PCT International Patent Application No. WO 2016/173804 A1 provides an immobilizer for bicycles.

Clutches, for example clutches that include axial claw clutch gear teeth, are described in the related art.

In the present patent application, a freewheel clutch is understood as one specific embodiment of a clutch. As a clutch, a freewheel clutch can transfer a torque only in one predefined rotational direction. When the rotational direction is reversed or when a rotational speed of a component to be driven is greater than that of a driving component, the connection for the power transmission is automatically released, the driving component being, for example, a pedal axle of a bicycle, and the component to be driven being a rear wheel or an output pinion, the output pinion being connected in particular to a pedal axle of the bicycle. Conventional freewheel clutches may include clamping rollers, clamping bodies, pawls, claw rings, and/or wrap springs, for example. Pawl freewheel clutches, for example, are generally recognized by a clicking sound during operation of the freewheel clutch. Freewheel clutches may also be designed as a toothed disk freewheel clutch, with two ring-shaped toothed disks situated next to one another in the axial direction. A ring-shaped toothed disk of a toothed disk freewheel clutch also generally includes on each side in the circumferential direction and in the axial direction wedge-shaped teeth. The two toothed disks are configured to engage with one another in the predefined rotational direction with the aid of the teeth, and thus to transfer a torque. The mechanical contact due to the intermeshing is assisted or ensured by an elastic force on one of the toothed disks in the axial direction. In the direction opposite the rotational direction, the wedge-shaped teeth of a toothed disk freewheel clutch in the circumferential direction run up against one another. Rider freewheeling of a bicycle allows a rider of a bicycle to rotate the pedals backwards, for example, since when the pedals are rotated backwards or when the freewheel clutch is rotated in the direction opposite the predefined rotational direction, a force-fit and/or form-fit connection to the torque transfer or power transmission within the freewheel clutch is interrupted. Electric bicycles generally generate a motor torque for providing power assistance to the rider with the aid of an electric motor, for example as a function of a detected rider torque. Rider freewheeling with electric bicycles prevents corotation of the pedals during operation, for example during operation of a pushing aid and/or in brief phases of a subsequent turning of the electric motor during normal operation. For example, without the rider freewheeling, a further rotation of the pedals by a motor torque generated for providing power assistance to the rider would result, since the motor torque is generally reduced to zero only just after a force of the rider on the pedals stops. Consequently, in electric bicycles, a rider freewheel clutch as a clutch is very often situated in the drive train between the pedal axle and an electric motor as a drive motor for providing power assistance to the rider, in particular when the electric motor is situated in the vicinity of the pedal axle or at the so-called middle motor position.

An object of the present invention is to improve theft prevention for an electric bicycle.

SUMMARY

The object may be achieved according to embodiments of the present invention.

The present invention relates to a method for immobilizing a vehicle; a drive train of the vehicle includes a clutch, the clutch in particular being a freewheel clutch and particularly preferably a toothed disk freewheel clutch.

The clutch according to the present invention includes a first clutch component and a second clutch component that are situated coaxially with respect to one another. Consequently, the first clutch component is in particular a first freewheel clutch component, and the second clutch component is in particular a second freewheel clutch component. The first and second clutch components are configured to make contact in a mechanically releasable manner. The mechanical contact results in particular from an elastic force on the first clutch component or the second clutch component in an axial direction, and in the direction of the respective other clutch component. The first clutch component and the second clutch component in particular in each case include a ring-shaped toothed disk, each toothed disk advantageously including teeth that are distributed in the circumferential direction of the toothed disk and pronounced in the axial direction, the teeth particularly preferably being wedge-shaped. Each toothed disk is advantageously configured to engage with the other toothed disk with the aid of the teeth, and to form a releasable mechanical contact. If the clutch is a freewheel clutch, the mechanical contact for torque transfer in the predefined rotational direction is advantageously established due to the intermeshing of the teeth, situated in the circumferential direction, of the two toothed disks in a predefined rotational direction, the teeth in particular being wedge-shaped. The first and/or second clutch component are/is also advantageously configured to be situated coaxially around a shaft, and to be guided by this shaft with the aid of at least one groove of the first and/or second clutch component, the shaft in particular being a pedal axle of a bicycle as the vehicle, which for guiding the first and/or second clutch component advantageously includes at least one track that is situated at the outer surface of the shaft in the radial direction and extends at the outer surface in the axial direction of the shaft. In other words, the first and/or second clutch component are/is configured to be guided by the track of the shaft in the axial direction of the shaft, in particular with the aid of the groove. Due to the mechanical contact, the first and second clutch components are configured to be rotatably fixedly connected to one another in at least one predefined rotational direction. When the clutch is a freewheel clutch, the first and second clutch components or freewheel clutch component are/is configured to be connected so that they are freely rotatable with respect to one another during a rotation opposite the predefined rotational direction. In addition, the clutch is advantageously configured to rotatably fixedly connect, in particular at least in the predefined rotational direction, a shaft of the drive train to a hollow shaft that is situated coaxially around this shaft, the first clutch component in particular being configured to be rotatably fixedly connected to the shaft, and the second clutch component being configured to be rotatably fixedly connected to the hollow shaft.

The method according to an example embodiment of the present invention includes detecting an input of a user for activating an immobilizer. An actuator is subsequently actuated as a function of the detected input for activating the immobilizer in a further step, as the result of which the first clutch component and/or the second clutch component are/is moved or displaced in an axial direction. As a result, the releasable mechanical contact between the first clutch component and the second clutch component is separated, and in particular an intermeshing of the wedge-shaped teeth of the toothed disk of a freewheel clutch is separated. After the actuator is actuated, advantageously no torque may be transferred from the first clutch component to the second clutch component. This results in the advantage that for an activated immobilizer, a rider of the vehicle and/or a motor of the vehicle can no longer transmit force or torque to a drive wheel. Theft or unwanted moving of the vehicle is thus advantageously made significantly more difficult due to the method.

In one example embodiment of the present invention, a detection of the input of the user for activating the immobilizer takes place by detecting a removal of a human-machine interface or a display device from a holder of the vehicle for the human-machine interface, or by detecting a removal of a key from a lock of the vehicle, or by detecting a spatial distance of a key from the vehicle, or by detecting a spatial distance of a mobile processing unit, in particular a smart phone, from the vehicle. After the input of the user is detected, an electrical blocking signal or an electromagnetic blocking signal is advantageously generated with the aid of the human-machine interface and/or the holder and/or a control unit and/or the key and/or the mobile processing unit, the electrical blocking signal or electromagnetic blocking signal being configured to effectuate the actuation of the actuator. As a result of this embodiment, the immobilizer is advantageously automatically activated by a user or rider of the vehicle in a simple and convenient manner, and without an additional input step.

In one refinement of the present invention, it may be provided that the method, after the actuator is actuated, includes a detection of a further input of the user for deactivating the immobilizer. The detection of the further input of the user advantageously takes place by detecting a positioning or configuration of the human-machine interface at a holder of the vehicle for the human-machine interface or by detecting a configuration of a key in a lock of the vehicle, or by detecting a spatial approach of a key to the vehicle, or by detecting a spatial approach of a mobile processing unit, in particular a smart phone, to the vehicle. After the further input of the user is detected, in addition an electrical unlocking signal or an electromagnetic unlocking signal is advantageously generated with the aid of the human-machine interface and/or the holder and/or a control unit and/or the key and/or the mobile processing unit, the electrical unlocking signal or electromagnetic unlocking signal being configured to effectuate the actuation of the actuator. The unlocking signal is in particular sent to a processing unit in encrypted form. The unlocking signal also represents in particular an identification code for the human-machine interface (HMI) and/or for the key and/or for the mobile processing unit. In this refinement, the actuator is subsequently actuated as a function of the detected further input for deactivating the immobilizer, as the result of which the first clutch component and/or the second clutch component are/is moved in the axial direction, and the first clutch component and the second clutch component are brought into mechanical contact with one another, in particular with the aid of the teeth, or mechanically connected in at least one rotational direction for transferring a torque. In particular, the actuation of the actuator as a function of the detected further input for deactivating the immobilizer results in intermeshing of the teeth, which are wedge-shaped in the circumferential direction, of a toothed disk of a toothed disk freewheel clutch. A torque transfer in the predefined rotational direction of the freewheel clutch is thus made possible with the aid of the freewheel clutch. This refinement results in the advantage that the immobilizer is automatically deactivated by a user or rider of the vehicle in a simple and convenient manner, and without an additional input step.

In one preferred embodiment of the present invention, an adjusting gearwheel is rotated by actuating the actuator for activating the immobilizer, the actuator in particular including an electric motor. The electric motor is advantageously configured to rotate the adjusting gearwheel, which is rotatably fixedly connected to the rotor. The adjusting gearwheel engages with toothing of a screw element. The screw element is in particular situated coaxially with respect to a shaft of the drive train. The screw element advantageously includes external teeth as toothing, the external teeth in particular being toothed in a graduated manner. The screw element also includes a thread, in particular a male thread. The screw element is rotated with respect to a stationary mating thread by the rotating adjusting gearwheel, which engages with the toothing, and with the aid of the thread, resulting in a movement of the screw element in the axial direction. The screw element also includes a mechanical stop. Upon rotation or axial movement of the screw element, the screw element moves the first clutch component and/or the second clutch component in the axial direction with the aid of the mechanical stop. The mechanical contact between the first clutch component and the second clutch component is advantageously separated in this way.

In an optional design of the present invention, the first clutch component and/or the second clutch component are/is magnetized. In addition, in this design the actuator includes a coil. Due to the activation, with the aid of the coil a magnetic field that acts on the magnetized first clutch component and/or the magnetized second clutch component is generated. In this design, due to a resulting magnetic force based on the magnetic field, the first clutch component and/or the second clutch component are/is displaced, and the mechanical contact between the first clutch component and the second clutch component is separated. This design results in the advantage that the separation of the mechanical contact between the first clutch component and the second clutch component may take place very quickly and free of wear. In addition, this design advantageously has a relatively small installation space for the actuator.

In a further design of the present invention, the actuator is configured to position, due to the actuation, a pin in a groove that is situated at the circumference of the clutch and between the first clutch component and the second clutch component. The pin that is positioned in the groove with the aid of the actuator is guided by the groove when the clutch rotates, the groove having a constriction.

When the clutch rotates, in particular in the predefined rotational direction, the clutch is configured to displace the first clutch component and/or the second clutch component in the axial direction with the aid of the pin and the constriction. The mechanical contact between the first clutch component and the second clutch component is thus separated. This design results in the advantage that the separation of the mechanical contact between the first clutch component and the second clutch component may take place with few components and a very small installation space.

Moreover, the present invention relates to a clutch, the clutch in particular being a freewheel clutch and particularly preferably being a toothed disk freewheel clutch. According to an example embodiment of the present invention, the clutch includes at least one first clutch component and one second clutch component. The first clutch component and the second clutch component are situated coaxially with respect to one another, and are configured to be rotatably fixedly connected by a releasable mechanical contact between the first clutch component and the second clutch component when the clutch rotates in at least one predefined rotational direction. The first clutch component and the second clutch component are preferably freely rotatable relative to one another during a rotation opposite the predefined rotational direction, so that the clutch is a freewheel clutch. The clutch also includes an actuator, the actuator being configured to displace the first clutch component and/or the second clutch component in the axial direction when the immobilizer is activated, as the result of which the mechanical contact between the first and second clutch components is separated. The first and/or second clutch component are/is advantageously configured to be guided on a shaft of a drive train of a vehicle. In addition, the clutch is advantageously configured to rotatably fixedly connect a shaft of the drive train to a hollow shaft, situated coaxially around this shaft, in the predefined rotational direction. The clutch has the advantage that a reliable mechanical contact between the first and second clutch components may be established or separated, as the result of which a transfer of a torque with the aid of the clutch is ensured when the immobilizer is deactivated. Furthermore, based on an activation of the immobilizer by actuating the actuator, a transfer of a torque may be prevented with the aid of the clutch and reliable antitheft protection may thus be provided, since the vehicle advantageously can no longer be independently moved or operated when the immobilizer is deactivated.

In one optional embodiment of the present invention, the clutch may include a processing unit. The processing unit is configured to receive an electrical or electromagnetic unlocking signal. In addition, the processing unit is configured to actuate the actuator as a function of the received unlocking signal for establishing the mechanical contact, the unlocking signal in particular representing an identification code. This optional embodiment results in the advantage that the immobilizer may be automatically deactivated by a user or rider of the vehicle in a simple and convenient manner, and without an additional input step.

In one preferred embodiment of the present invention, the actuator of the clutch includes an electric motor. The rotor of the electric motor is rotatably fixedly connected to an adjusting gearwheel. The adjusting gearwheel engages with toothing of a screw element, and is configured to be rotated relative to a stationary mating thread with the aid of a thread, and moved in the axial direction. The mating thread is advantageously fixed to a housing of a vehicle transmission or to a housing of a drive unit and/or to a frame of the vehicle, so that it is advantageously fixed in location. The screw element includes a mechanical stop that is configured to displace the first clutch component and/or the second clutch component in the axial direction. As a result of this embodiment of the clutch, the mechanical contact between the first clutch component and the second clutch component may be reliably separated in the axial direction in an advantageous manner when the immobilizer is activated. This embodiment of the clutch has the technical advantage that the resulting functioning of the immobilizer of the vehicle is robust against impacts and external or internal magnetic fields, resulting in a high level of reliability and durability.

According to an example embodiment of the present invention, the clutch also preferably includes an optional spring element. The spring element is configured to generate an elastic force, the elastic force acting on the first clutch component in the axial direction and in the direction of the second clutch component, or acting on the second clutch component in the axial direction and in the direction of the first clutch component. This design results in the advantage that an inadvertent activation of the immobilizer is avoided, and the deactivation of the immobilizer is facilitated. In addition, in this design a reliable mechanical contact between the first and second clutch components is advantageously established when the immobilizer is deactivated, thus ensuring a transfer of a torque, with the aid of the clutch, in the predefined rotational direction when the immobilizer is deactivated.

In another embodiment of the present invention, the first clutch component and/or the second clutch component are/is magnetized. In addition, the actuator in this embodiment includes a coil that is configured to generate a magnetic field when the immobilizer is activated, the magnetic field acting on the magnetized first clutch component and/or the magnetized second clutch component, and the first clutch component and/or the second clutch component being displaced in the axial direction by a magnetic force of the magnetic field. This embodiment advantageously results in a clutch that is compact, low-wear, and low-maintenance.

In a further embodiment of the present invention, the actuator is configured to position a pin in a groove that is situated at the circumference of the clutch and between the first clutch component and the second clutch component when the immobilizer is activated. The groove is configured to guide the pin when the clutch rotates, the groove having at least one constriction in the direction of one of the clutch components. The clutch is configured to displace the first clutch component and/or the second clutch component in the axial direction, with the aid of the pin and the constriction, when the clutch rotates, in particular in the predefined rotational direction. The mechanical contact between the first clutch component and/or the second clutch component is thus advantageously separated. This embodiment advantageously results in a compact and satisfactory clutch.

Moreover, the present invention relates to a vehicle transmission that includes a clutch according to the present invention.

Furthermore, the present invention relates to a drive unit for a vehicle, including a clutch according to the present invention, in particular a drive unit for an electric bicycle.

Moreover, the present invention relates to a vehicle that includes a clutch according to the present invention, the clutch particularly preferably being designed as a freewheel clutch, and/or a vehicle including a vehicle transmission according to the present invention and/or a drive unit according to the present invention. In particular, the vehicle is an electric bicycle.

Further advantages result from the following description of exemplary embodiments, with reference to the figures.

DETAILED DESCRIPTION OF EXAMPLE EMBODIMENTS

Figure 1:
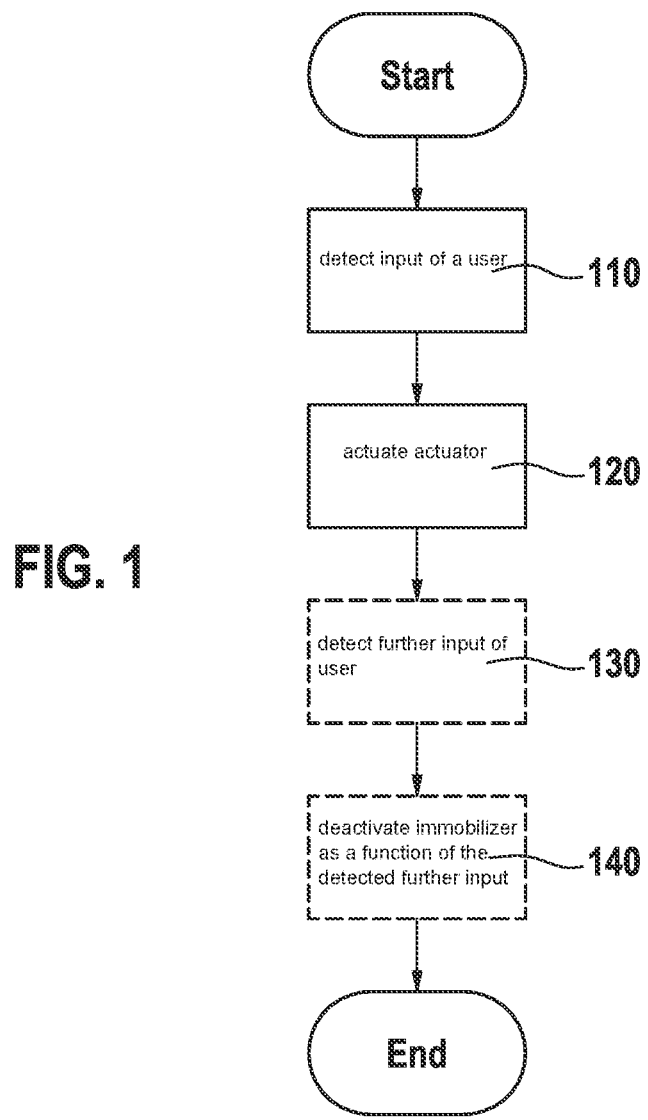
FIG. 1 shows a flowchart of the method as a block diagram, according to an example embodiment of the present invention.

FIG. 1 illustrates a flowchart of the method as a block diagram. An input of a user for activating an immobilizer of a vehicle is detected in a first step 110. A removal of a display device or of a human-machine interface from a holder of the vehicle is preferably detected in step 110 as an input of the user for activating the immobilizer. An actuator is subsequently actuated in a second step 120 as a function of the detected input of the user. As the result of actuating the actuator, a first clutch component and/or a second clutch component of a clutch are/is displaced in the axial direction in second step 120, the first clutch component and the second clutch component being situated coaxially with respect to one another. The clutch is in particular a freewheel clutch. Consequently, the first clutch component is in particular a first freewheel clutch component and the second clutch component is in particular a second freewheel clutch component. The mechanical contact between the first clutch component and the second clutch component is separated due to second step 120. A further input of the user for deactivating the immobilizer is detected in an optional third step 130. For deactivating the immobilizer, the actuator is subsequently actuated in an optional fourth step 140 as a function of the detected further input. As the result of actuating the actuator, in step 140 the first clutch component and/or the second clutch component are/is displaced back in the axial direction, and the first clutch component and the second clutch component are once again brought into mechanical contact with one another. The establishment of the mechanical contact in optional fourth step 140 may result from an elastic force of an optional spring element that acts in the axial direction. In other words, in fourth step 140 it may be provided that the actuation of the actuator displaces the first clutch component and/or the second clutch component in the axial direction, as the result of which the elastic force presses the first clutch component or the second clutch component against the respective other clutch component.

Figure 2:
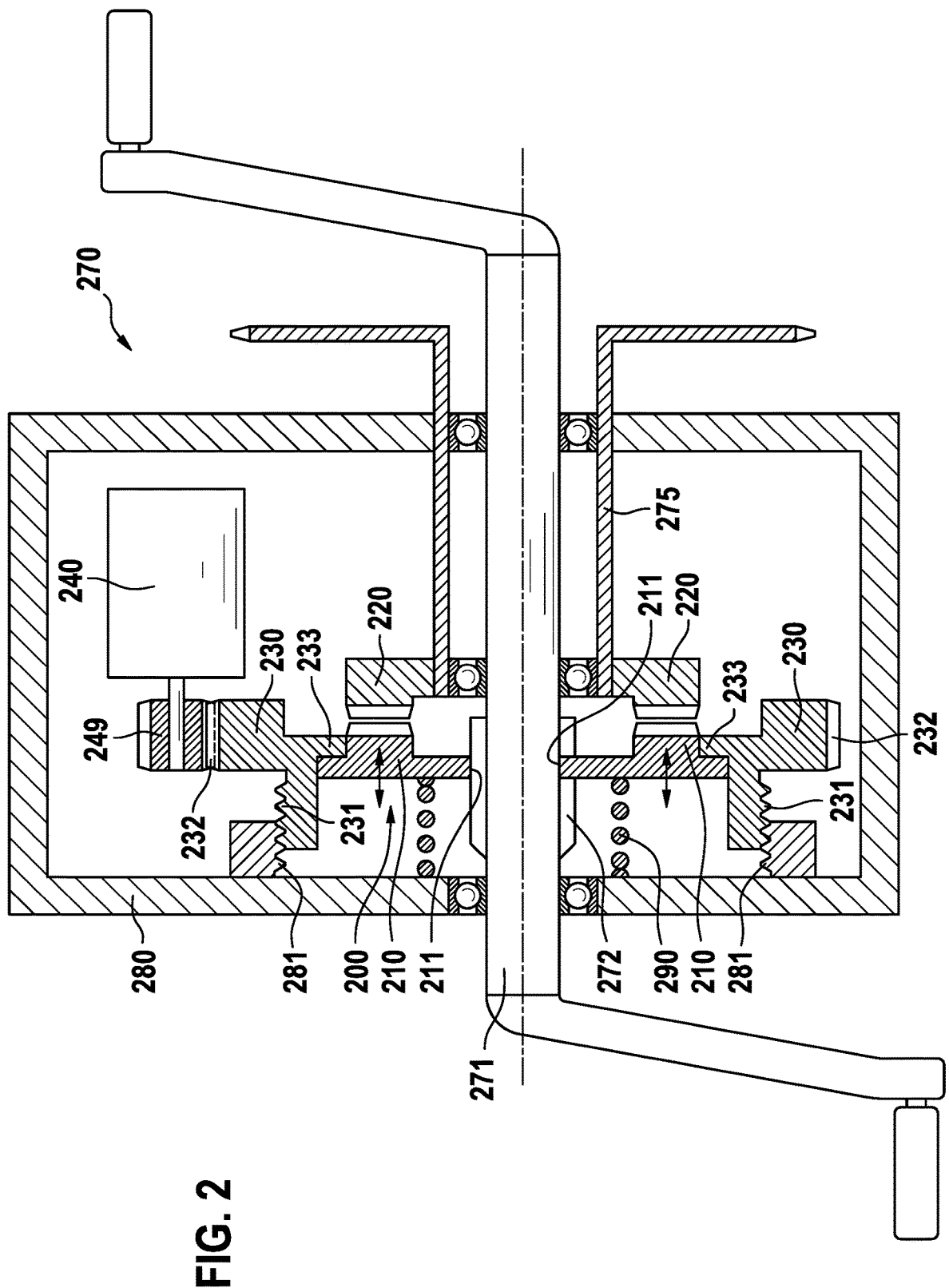
FIG. 2 shows a drive unit including a toothed disk clutch with a screw element, according to an example embodiment of the present invention.
Figure 3:
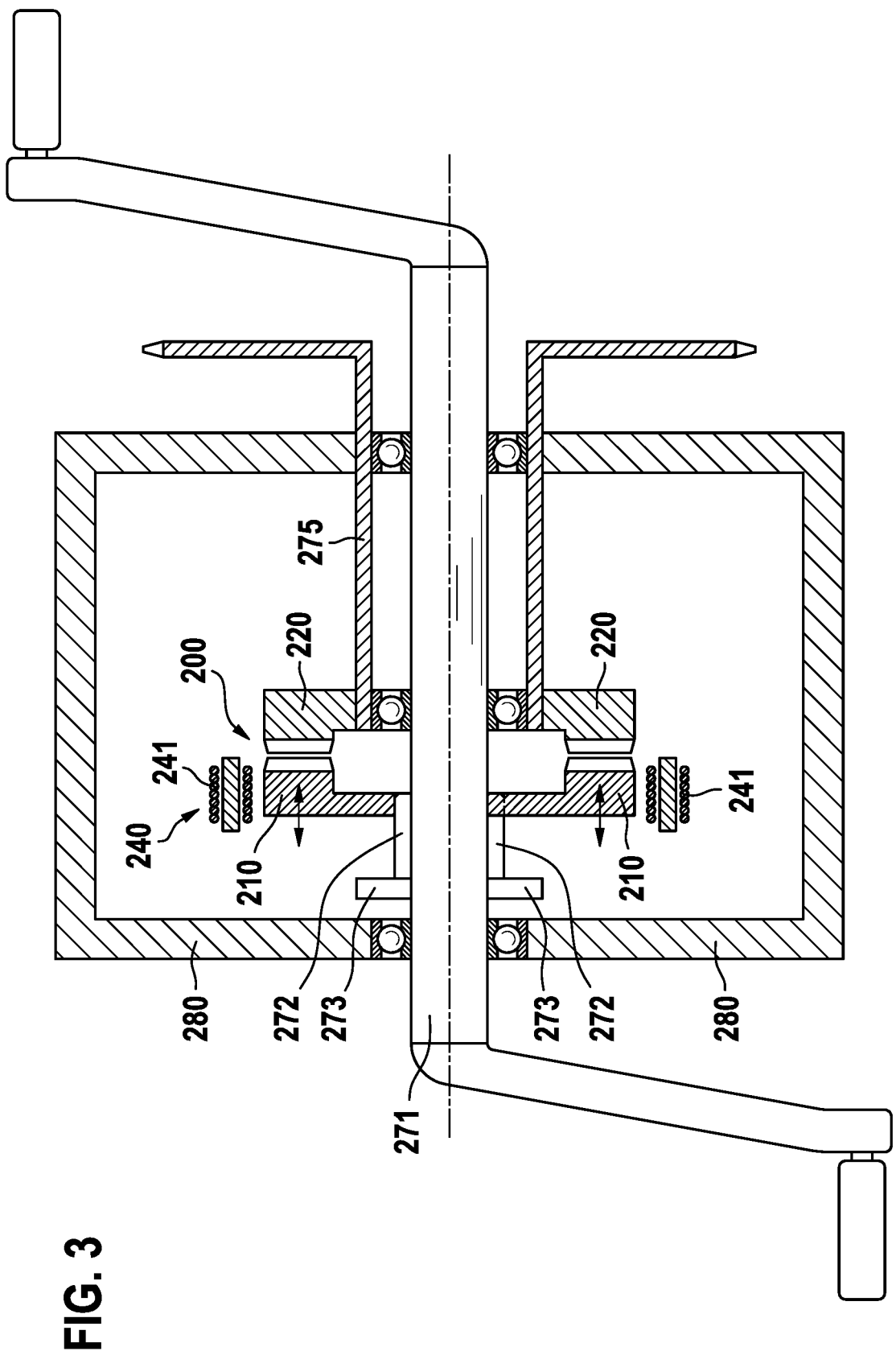
FIG. 3 shows a drive unit including a toothed disk clutch with a coil, according to an example embodiment of the present invention.
Figure 4:
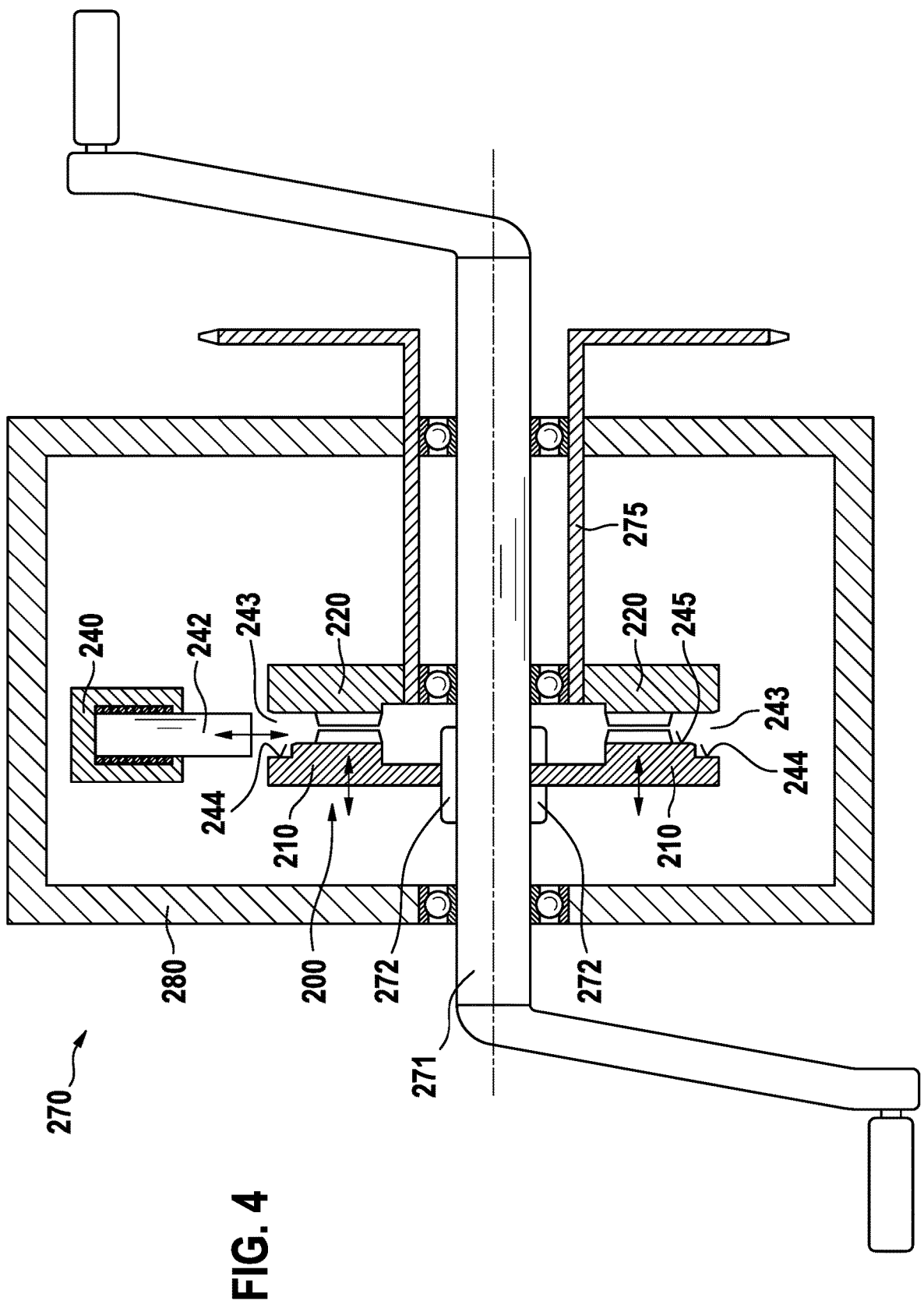
FIG. 4 shows a drive unit including a disk clutch with a pin actuator, according to an example embodiment of the present invention.

FIGS. 2 through 4 each illustrate a drive unit 270 of an electric bicycle, including a toothed disk clutch as clutch 200, in particular a toothed disk freewheel clutch, at a pedal axle of an electric bicycle. Initially, clutch 200 in drive unit 270 is explained below. Clutch 200 in each case includes a first toothed disk as first clutch component 210 and a second toothed disk as second clutch component 220. In these exemplary embodiments, first clutch component 210 and second clutch component 220 are situated next to one another and in each case have a ring shape. First clutch component 210 or the first toothed disk and second clutch component 220 or the second toothed disk are situated coaxially with respect to one another and coaxially around the pedal axle. The pedal axle, as shaft 271 of the drive train, includes pronounced tracks 272 at the outer surface in the axial direction. First clutch component 210 has a number of grooves 211 that corresponds to the number of tracks 272. The grooves of the first clutch component are configured to encompass tracks 272 of shaft 271. First clutch component 210 is rotatably fixedly connected to shaft 271 with the aid of grooves 211 and tracks 272, and is configured to be guided in the axial direction. Second clutch component 210 is rotatably fixedly connected to a hollow shaft 275, hollow shaft 275 likewise being situated coaxially with respect to shaft 271. First clutch component 210 and second clutch component 220 are also configured to make contact in a mechanically releasable manner. The mechanical contact preferably, but not necessarily, results from an elastic force on first clutch component 210 in an axial direction in the direction of second clutch component 220, the elastic force being generated with the aid of an optional spring element 290. Optional spring element 290 is preferably clamped between housing 280 of drive unit 270 and first clutch component 210. First clutch component 210 or the first toothed disk and second clutch component 220 or the second toothed disk in each case include a plurality of axially pronounced teeth that are distributed, advantageously uniformly, in the circumferential direction of the particular toothed disk, the teeth having a pronounced wedge-shaped design in particular in the circumferential direction of the particular toothed disk. First clutch component 210 or the first toothed disk and second clutch component 220 or the second toothed disk are thus configured to engage with one another, in particular when optional spring element 290 presses the first toothed disk and the second toothed disk together. The mechanical contact for the torque transfer in the predefined rotational direction is advantageously established due to the intermeshing of the teeth of the two toothed disks, distributed in the circumferential direction. Due to a preferred wedge-shaped design of the teeth, first clutch component 210 and second clutch component 220 are configured to be rotatably fixedly connected to one another in a predefined rotational direction, and during a rotation opposite the predefined rotational direction, to be connected so that they are freely rotatable relative to one another.

FIG. 2 illustrates a drive unit 270 that includes a clutch 200, clutch 200 in this design including a screw element 230, as well as a servomotor as actuator 240. Screw element 230 is a hollow shaft that is situated coaxially with respect to the pedal axle. Screw element 230 is advantageously situated, at least partially, outside first clutch component 210, second clutch component 220, shaft 271, and hollow shaft 275. Screw element 230 includes a male thread as thread 231, which engages with a mating thread 281. Mating thread 281 is a female thread, for example a female thread in a borehole. Mating thread 281 is stationarily or rotatably fixedly fixed to housing 280 of drive unit 270. Screw element 230 also includes external teeth as toothing 232 at an outer surface, the external teeth being toothed in a graduated manner and extending in the circumferential direction. The rotor of servomotor 240 is rotatably fixedly connected to an adjusting gearwheel 249 that is toothed in a graduated manner, adjusting gearwheel 249 engaging with toothing 232 of screw element 230. In other words, servomotor 240, as an actuator, is configured to rotate or turn screw element 230 with respect to mating thread 281, as the result of which screw element 230 is moved relative to mating thread 281 in the axial direction, and is thus also moved relative to shaft 271. Screw element 230 also includes a mechanical stop 233 or an entraining element at an inner surface of the hollow shaft. This mechanical stop 233 is configured to displace or entrain first clutch component 210 in the axial direction with respect to second clutch component 220 when screw element 230 moves in the axial direction. When first clutch component 210 is axially displaced, first clutch component 210 is guided in the axial direction with the aid of grooves 211 of first clutch component 210 and tracks 272 of shaft 271. Due to the axial displacement, the teeth of the toothed disks or the first clutch element and the second clutch element no longer engage with one another. In other words, the mechanical contact between first clutch element 210 and second clutch element 220 is separated due to the axial displacement. A torque transfer between first clutch element 210 and second clutch element 220 is thus interrupted and the immobilizer is activated. If the clutch is a freewheel clutch, the torque transfer is interrupted, in particular in the predefined rotational direction.

FIG. 3 once again illustrates a drive unit 270 that includes a toothed disk clutch, in particular a toothed disk freewheel clutch, as clutch 200, clutch 200 in this design including at least one coil 241 as actuator 240. First clutch component 210 is magnetized in this design. Due to activation 120, a current flows through coil 241, so that a magnetic field is generated with the aid of coil 241. The magnetic field acts on magnetized first clutch component 210, as the result of which a resulting magnetic force displaces first clutch component 210 along tracks 272 of shaft 271 in the axial direction, so that the mechanical contact between first clutch component 210 and second clutch component 220 is separated. The axial movement of first clutch component 210 may also be limited with the aid of a mechanical stop 273 of shaft 271. When the immobilizer is activated, mechanical stop 273 may also have surface contact with first clutch component 210, which is configured to couple magnetized first clutch component 210 to mechanical stop 273 of the shaft, or to fix the magnetized first clutch component until the immobilizer is deactivated, thus maintaining the separation of the mechanical contact between first clutch component 210 and second clutch component 220 without current. The return of first clutch component 210 preferably takes place in step 140, after a detected further input for deactivating the immobilizer, by reactivating coil 241 as actuator 240, the direction of the current flow in coil 241 being opposite that for controlling the actuation of the immobilizer, or the polarity of the generated magnetic field being reversed.

FIG. 4 once again illustrates a drive unit 270 that includes a toothed disk clutch, in particular a toothed disk freewheel clutch, as clutch 200, clutch 200 in this design including a cylinder magnet or solenoid as actuator 240. Actuator 240 in this design is configured to position, due to activation 120, a cylindrical pin 242, situated opposite from clutch 200 in the radial direction, in a groove 243 situated at the circumference of clutch 200 and between first clutch component 210 and second clutch component 220. A first edge surface 244 of groove 243 is advantageously formed from first clutch component 210, and a second edge surface of groove 243 is advantageously formed from second clutch component 220, the second edge surface of groove 243 extending in a straight line along the circumference, and second clutch component 220 being immovable with respect to shaft 271. Along the circumference, groove 243 has at least one constriction or a curve at first edge surface 244 that is directed toward the second edge surface of groove 243. When clutch 200 rotates, pin 242 is guided by groove 243 up to the constriction. Once it has arrived there, the pin is guided along first edge surface 244; however, groove 243 is narrower than the diameter of pin 242, resulting in generation of a force on first and second clutch component 220 in the axial direction. Since second clutch component 220 is axially immovable, first clutch component 210 is displaced in the axial direction and away from the second clutch component. The mechanical contact between first clutch component 210 and second clutch component 220 is separated in this way. Upon further rotation of the clutch in the predefined rotational direction, pin 242 is positioned opposite first clutch component 210 at a different circumferential edge 245, pin 242 in particular at the same time being positioned radially deeper between first clutch component 210 and second clutch component 220, and guided between circumferential edge 245 and the second edge surface of groove 243. For deactivating the immobilizer, pin 242 is pulled or positioned in the radial direction toward the actuator, and outside the surface of first clutch component 210 and second clutch component 220.

Figure 5A:
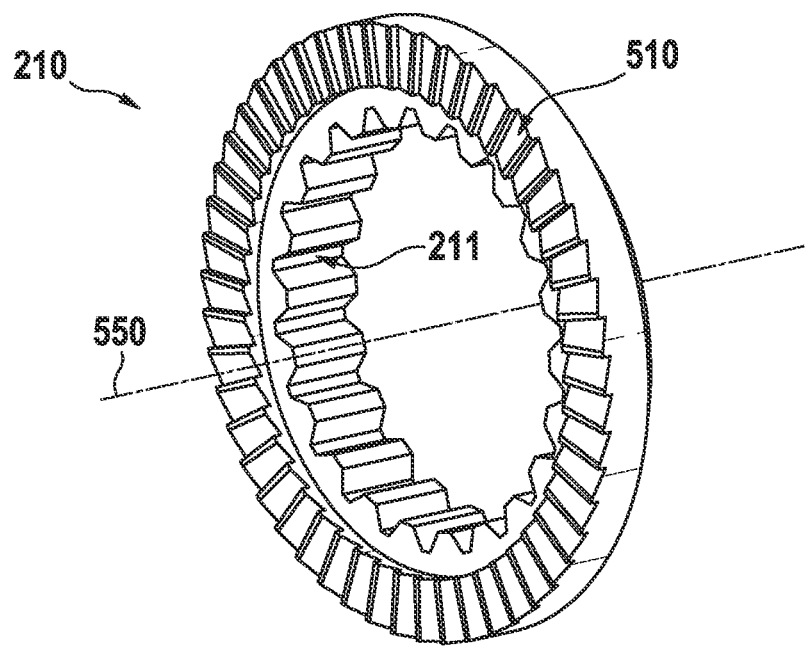
FIG. 5A shows a first clutch component of a freewheel clutch as the clutch, according to an example embodiment of the present invention.

FIG. 5A illustrates a preferred design of first clutch component 210 of clutch 200 as a toothed disk freewheel clutch. First clutch component 210 is a toothed disk or is ring-shaped, and has a number of straight grooves 211 extending in the axial direction at an inner circumference of the first clutch component. Ring-shaped first clutch component 210 is configured to be guided on a shaft 271 in the axial direction with the aid of grooves 211 at the inner circumference, and with the aid of tracks 272. First clutch component 210 is also configured to be contacted with or connected to a second clutch component 220 in a mechanically releasable manner. First clutch component 210 includes a plurality of wedge-shaped teeth 510 that are axially pronounced and uniformly distributed in the circumferential direction of the toothed disk. According to FIG. 5A, first clutch component 210, upon mechanical contact or engagement with a corresponding second clutch component 220, is configured to transfer a torque in a predefined rotational direction about central axis 550, and during a rotation opposite the predefined rotational direction, to be connected to second clutch component 220 in a freely rotatable manner.

Figure 5B:
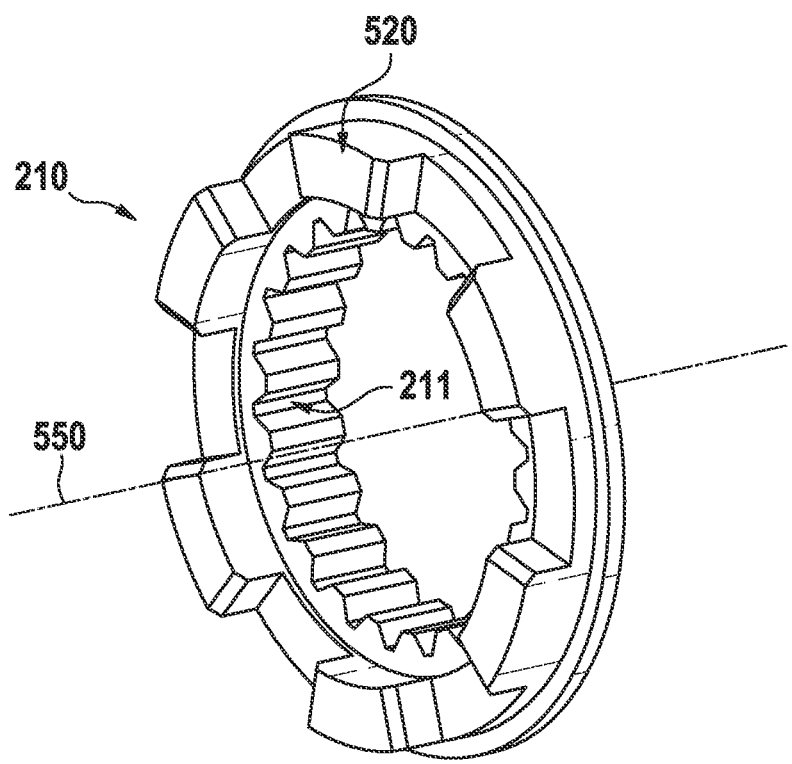
FIG. 5B shows a first clutch component of a clutch, according to an example embodiment of the present invention.

FIG. 5B illustrates a first clutch component 210 of a clutch 200. Compared to FIG. 5B, first clutch component 210 includes a plurality of axially pronounced teeth 520 that are uniformly distributed in the circumferential direction of the toothed disk. The teeth are arch-shaped, and in particular do not have a wedge-shaped design. According to FIG. 5B, first clutch component 210, upon mechanical contact or engagement with a corresponding second clutch component 220, is configured to transfer a torque to engaged second clutch component 220 in each of the two rotational directions about central axis 550 of the first clutch component. In addition, according to FIG. 5B, the same as in FIG. 5A, first clutch component 210 has straight grooves 211 extending in the axial direction, at the inner circumference.

What is claimed is:

1. A freewheel clutch for a vehicle, the clutch comprising:
    a first clutch component and a second clutch component that are situated coaxially with respect to one another and configured to be rotatably fixedly connected by a releasable mechanical contact between the first clutch component and the second clutch component when the clutch rotates in at least one predefined rotational direction;
    an actuator configured to displace one of the first clutch component and the second clutch component in an axial direction, as a result of which the mechanical contact between the first and second clutch components is separated;
    a first shaft to which the first clutch component is rotatably fixedly connected; and
    a second shaft that is hollow and coaxial with respect to the first shaft, wherein the second clutch component is rotatably fixedly connected to the second shaft, wherein the vehicle is an electric bicycle and the freewheel clutch is for the electric bicycle, wherein the actuator is configured to position a pin in a groove that is situated at a circumference of the clutch and between the first clutch component and the second clutch component, the groove being configured to guide the pin when the clutch rotates in the predefined rotational direction, the groove having a constriction in a direction of one of the first and second clutch components, the clutch being configured to displace one of the first clutch component and the second clutch component in the axial direction, using the pin and the constriction of the groove, when the clutch rotates in the predefined rotational direction.

2. The clutch as recited in claim 1, further comprising:
    a processing unit configured to:
        i. receive an electrical or electromagnetic unlocking signal; and
        ii. actuate the actuator as a function of the received unlocking signal for generating the mechanical contact, the signal representing an identification code.

3. The clutch as recited in claim 1, wherein the clutch is part of a drive train of the vehicle.

4. The clutch as recited in claim 1, further comprising a processor, wherein the processor is configured to detect a user input and to, in response to the detection of the user input, actuate the actuator to perform the displacement.

5. The clutch as recited in claim 4, wherein the detection by the processor takes place by detecting a removal of a display device from a holder of the vehicle.

6. The clutch as recited in claim 4, wherein the processor is configured to respond to a deactivation user input by actuating the actuator to displace one of the first clutch component and the second clutch component in the axial direction to thereby bring the first and second clutch components into contact with each other.

7. The clutch as recited in claim 1, wherein the pin is cylindrical.

8. The clutch as recited in claim 1, wherein the first shaft includes pronounced tracks at an outer surface in the axial direction, wherein the first clutch component has a number of grooves that corresponds to a number of the tracks, wherein the grooves of the first clutch component are configured to encompass the tracks of the first shaft.

9. The clutch as recited in claim 8, wherein the first clutch component is rotatably fixedly connected to the first shaft with the aid of the grooves and the tracks, wherein the first clutch component is configured to be guided in the axial direction, and wherein the second clutch component is rotatably fixedly connected to the second shaft, wherein the second shaft is situated coaxially with respect to the first shaft.

10. A freewheel clutch for a vehicle, the clutch comprising:
    a first clutch component and a second clutch component that are situated coaxially with respect to one another and configured to be rotatably fixedly connected by a releasable mechanical contact between the first clutch component and the second clutch component when the clutch rotates in at least one predefined rotational direction;
    an actuator configured to displace one of the first clutch component and the second clutch component in an axial direction, as a result of which the mechanical contact between the first and second clutch components is separated;
    a first shaft to which the first clutch component is rotatably fixedly connected; and
    a second shaft that is hollow and coaxial with respect to the first shaft, wherein the second clutch component is rotatably fixedly connected to the second shaft, wherein the vehicle is an electric bicycle and the freewheel clutch is for the electric bicycle,
    wherein:
    the actuator comprises a coil,
    the first clutch component or the second clutch component is magnetized,
    due to an activation of the coil, a magnetic field that acts on the magnetized first clutch component or the magnetized second clutch component is generated resulting in a resulting magnetic force based on the magnetic field, the first clutch component or the second clutch component is displaced, and the mechanical contact between the first clutch component and the second clutch component is separated.

* * * * *